United States Patent
Gray et al.

(10) Patent No.: US 9,083,258 B2
(45) Date of Patent: Jul. 14, 2015

(54) DEVICE FOR IMPROVING POWER EFFICIENCY FOR POWER FACTOR CORRECTIONS

(71) Applicants: Richard Landry Gray, Saratoga, CA (US); Yuhai Mao, Santa Clara, CA (US)

(72) Inventors: Richard Landry Gray, Saratoga, CA (US); Yuhai Mao, Santa Clara, CA (US)

(73) Assignee: Richard Landry Gray, Saratoga, CA (US)

( * ) Notice: Subject to any disclaimer, the term of this patent is extended or adjusted under 35 U.S.C. 154(b) by 0 days.

(21) Appl. No.: 14/186,939

(22) Filed: Feb. 21, 2014

(65) Prior Publication Data

US 2014/0292212 A1   Oct. 2, 2014

Related U.S. Application Data

(60) Provisional application No. 61/938,030, filed on Feb. 10, 2014, provisional application No. 61/768,524, filed on Feb. 24, 2013.

(51) Int. Cl.
*H05B 33/08* (2006.01)
*H02M 1/42* (2007.01)

(52) U.S. Cl.
CPC ........... *H02M 1/4208* (2013.01); *H05B 33/083* (2013.01); *H05B 33/0818* (2013.01); *Y02B 70/126* (2013.01); *Y10T 307/406* (2015.04)

(58) Field of Classification Search
USPC ................ 315/224, 246, 247, 307, 308, 291, 315/185 R, 191, 192
See application file for complete search history.

(56) References Cited

U.S. PATENT DOCUMENTS

2014/0042925 A1* 2/2014 Wang ............................ 315/232
2014/0239832 A1* 8/2014 Shteynberg et al. .......... 315/201

* cited by examiner

*Primary Examiner* — David H Vu

(57) ABSTRACT

A device for improving power efficiency for power factor correction is disclosed, which comprises a primary load, a power module, a power factor correction module, a current source module, and a secondary load. The power module rectifies an alternating current (AC) voltage to a pulsating direct current (DC) voltage. The power factor correction module filters the pulsating direct current (DC) voltage to a driving voltage. The current source module is connected to the power module, the primary load and a side of the power factor correction module that drives the primary load with the driving voltage. The secondary load is connected to another side of the power factor correction module, and is driven by the power factor correction module.

9 Claims, 8 Drawing Sheets

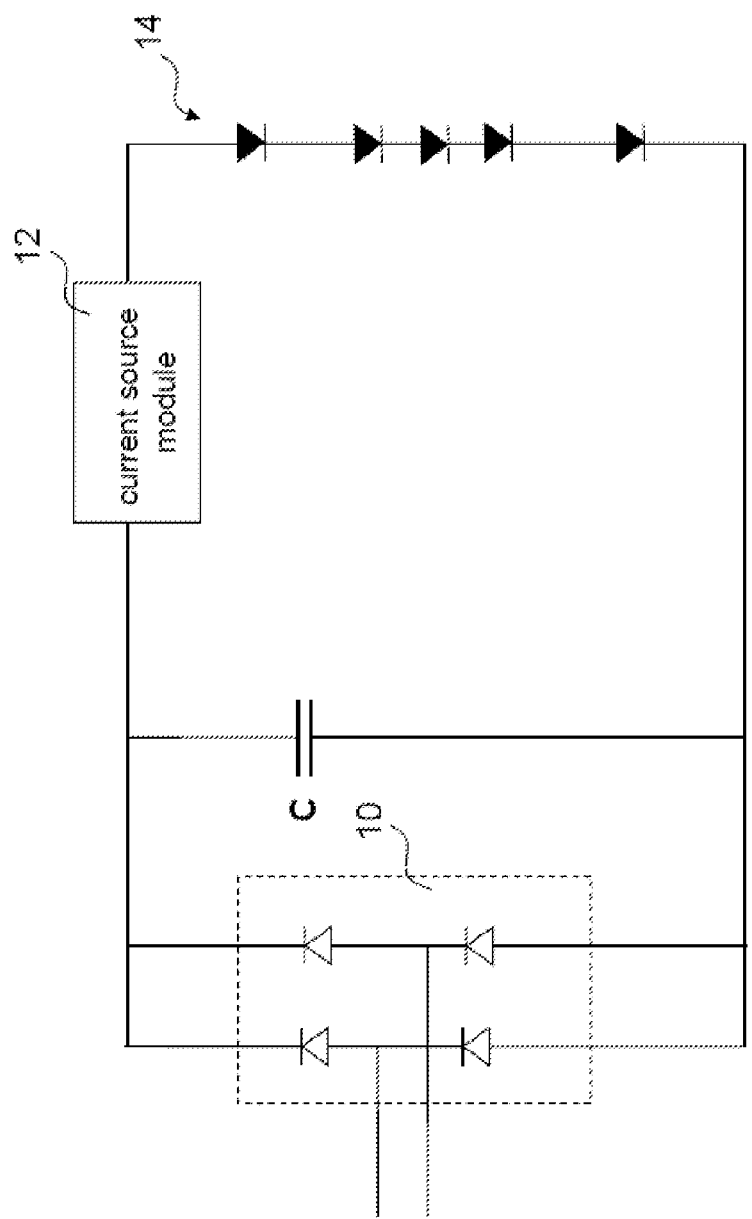
Fig. 1A     -- Prior Art --

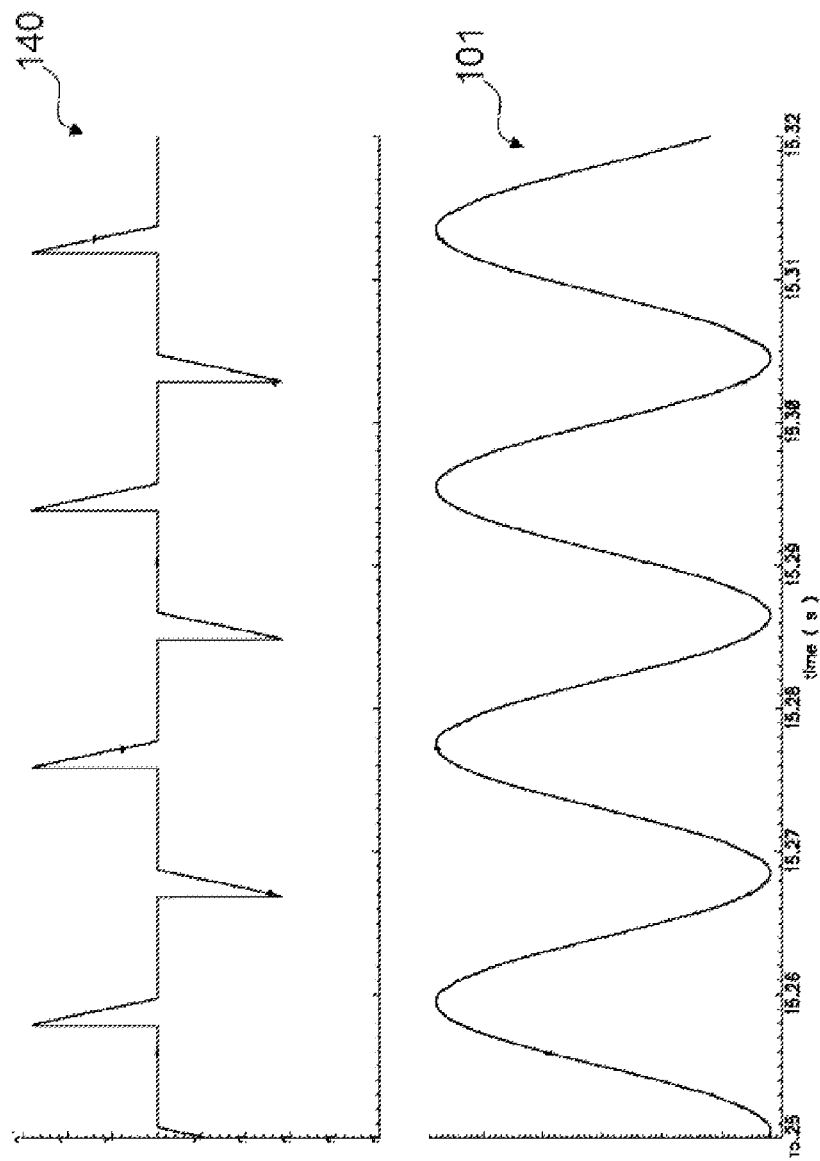
Fig. 1B -- Prior Art --

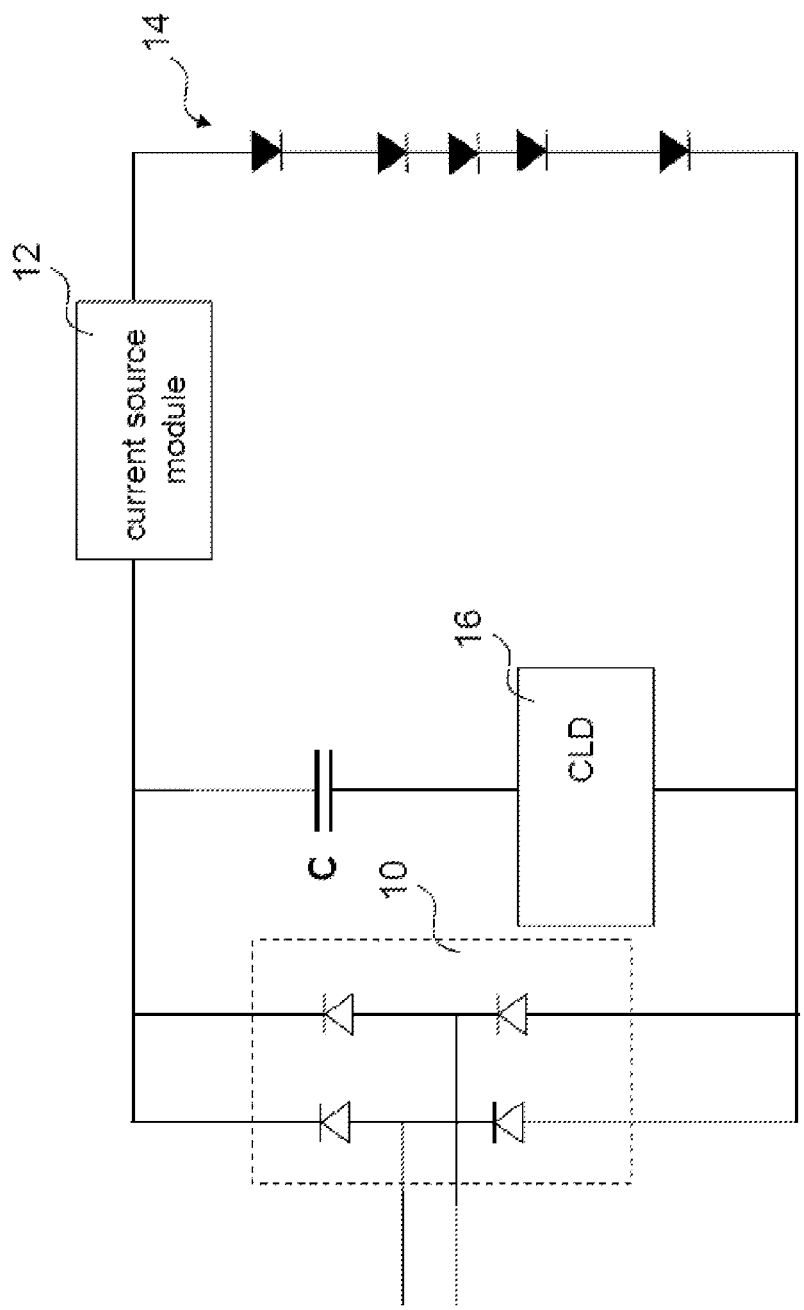
Fig. 2A -- Prior Art --

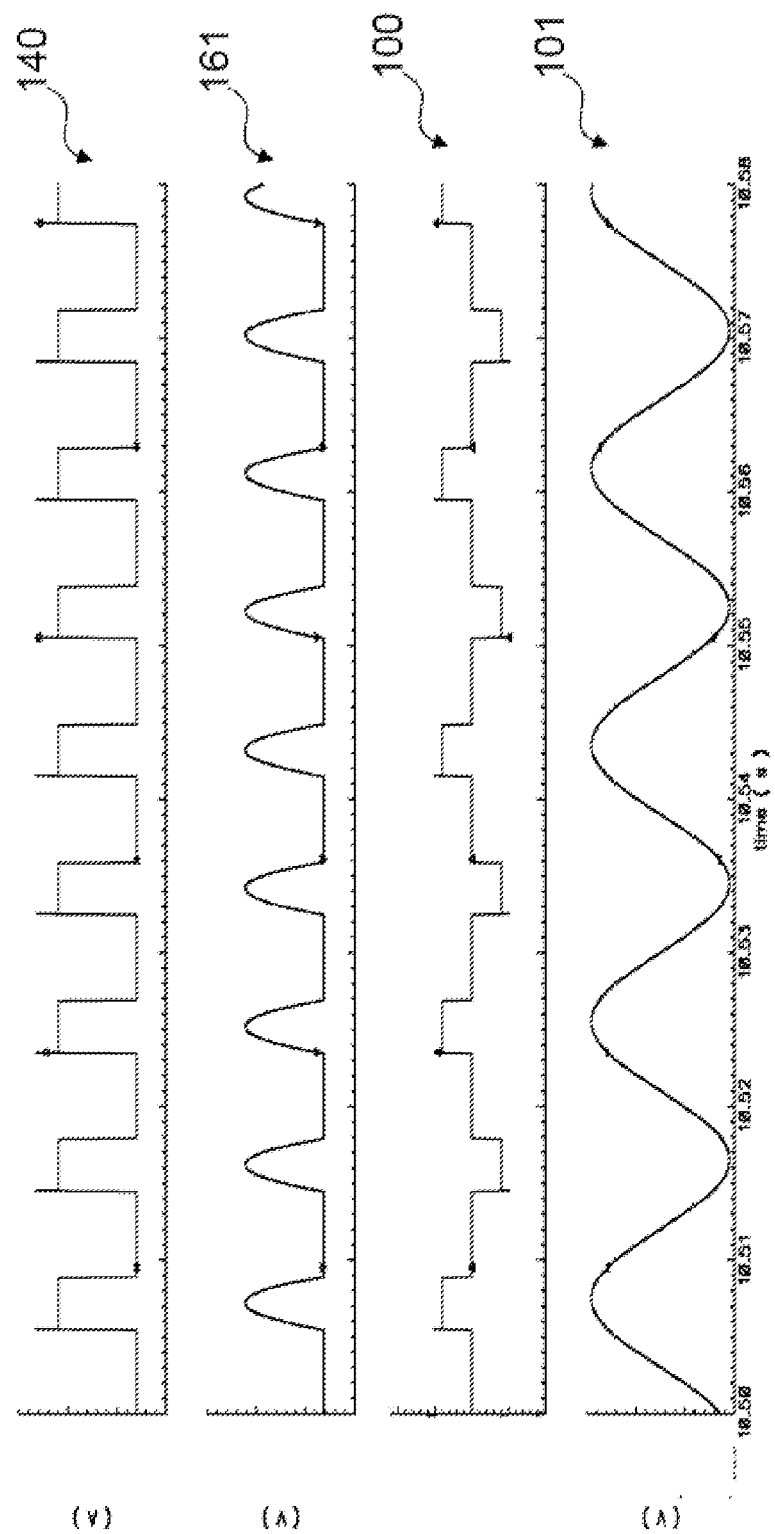
Fig. 2B -- Prior Art -- ents are provided along with illustrations to facilitate the
DEVICE FOR IMPROVING POWER EFFICIENCY FOR POWER FACTOR CORRECTIONS This application claims priority benefit under 35 USC 119 of provisional patent applications Ser. No. 61/938,030, filed 10 Feb. 2014, and Ser. No. 61/768,524, filed 24 Feb. 2013.

FIELD OF THE INVENTION

The present invention is related to schemes for power factor corrections with less power loss.

BACKGROUND

Many schemes exist for improving the power factor (PF) of an electrical appliance, specifically a lighting device. In most cases the increase in power factor is found at the expense of efficiency, cost, complexity or board space. Many a lighting designer has come up with a clever way to improve the PF of a lighting device only to have its efficiency degrade once a PF correction scheme is instituted.

With reference to FIGS. 1A and 1B, the typical high efficiency lighting, using light emitting diode (LED) bulbs 14 as the light source, is often driven by a constant current source module 12 that receives power from a diode bridge rectifier 10 with the filter capacitor C that smooths out the voltage waveform. FIG. 1B illustrates the relationship of input current and voltage, indicating that the circuit of FIG. 1A has low PF and high harmonic distortion. The filter capacitor C discharges slowly but charges very quickly. It results in sharp current spikes 140 in every half cycle of the input voltage 101. The PF value for FIG. 1B is 0.5.

Bridge rectifier 10 and filter capacitor C rectify an incoming alternating (AC) voltage, supplying a pulsating DC voltage for the current source module 12, as is commonly used in many electronic devices. As shown in FIGS. 2A and 2B, a current limiting device (CLD) 16 can be inserted in series with the filter capacitor C for improving the power factor. FIG. 2B shows the simulated results of the input current 100 and the input voltage 101 after the addition of a CLD device. The filter capacitor's C current is limited to some finite value during each half cycle of the input voltage 101. The PF of the circuit simulated in FIG. 2B is 0.8.

Another benefit of the CLD device is that the inrush current into the electronic device is naturally limited to a modest amount which eliminates the need for an inrush current protecting device.

However, in order to limit the current, a voltage 161, as shown in FIG. 2B, must be developed across the CLD device. The CLD sustains a significant voltage 161 and current while it is limiting current (inrush current or capacitor's current), which results in wasted energy in the form of heat. Therefore, the drawback of the additional CLD device is a loss of efficiency compared to the case without a CLD device

Some Exemplary Embodiments

These and other needs are addressed by the present invention, wherein an approach is provided for a device that improves power efficiency of a power factor correction scheme.

According to an aspect of an embodiment of the present invention, the device comprises a primary load, a power module, a power factor correction module, a current source module, and a secondary load. The power module rectifies an alternating current (AC) voltage to a pulsating direct current (DC) voltage. The power factor correction module filters the pulsating direct current (DC) voltage to a driving voltage. The current source module is connected to the power module, the primary load and a side of the power factor correction module that drives the primary load with the driving voltage. The secondary load is connected to another side of the power factor correction module, and is driven by the power factor correction module.

In order to provide further understanding and elaboration regarding to the present invention, the following embodiments are provided along with illustrations to facilitate the disclosure of the present invention.

BRIEF DESCRIPTION OF THE DRAWINGS

The invention is illustrated by way of example, and not by way of limitation, in the figures of the accompanying drawings in which like reference numerals refer to similar elements and in which:

FIG. 1A is a circuit diagram of a conventional current source driving LED devices with a filter capacitor;

FIG. 1B are simulated waveforms illustrating the relationship of input current and voltage of the circuitry scheme in FIG. 1A;

FIG. 2A is a circuit diagram of a conventional CLD plus standard LED device;

FIG. 2B are simulated waveforms illustrating the relationships of input current and voltage between the CLD and the LED in FIG. 2A;

DESCRIPTION OF THE PREFERRED EMBODIMENT

Figure 3:
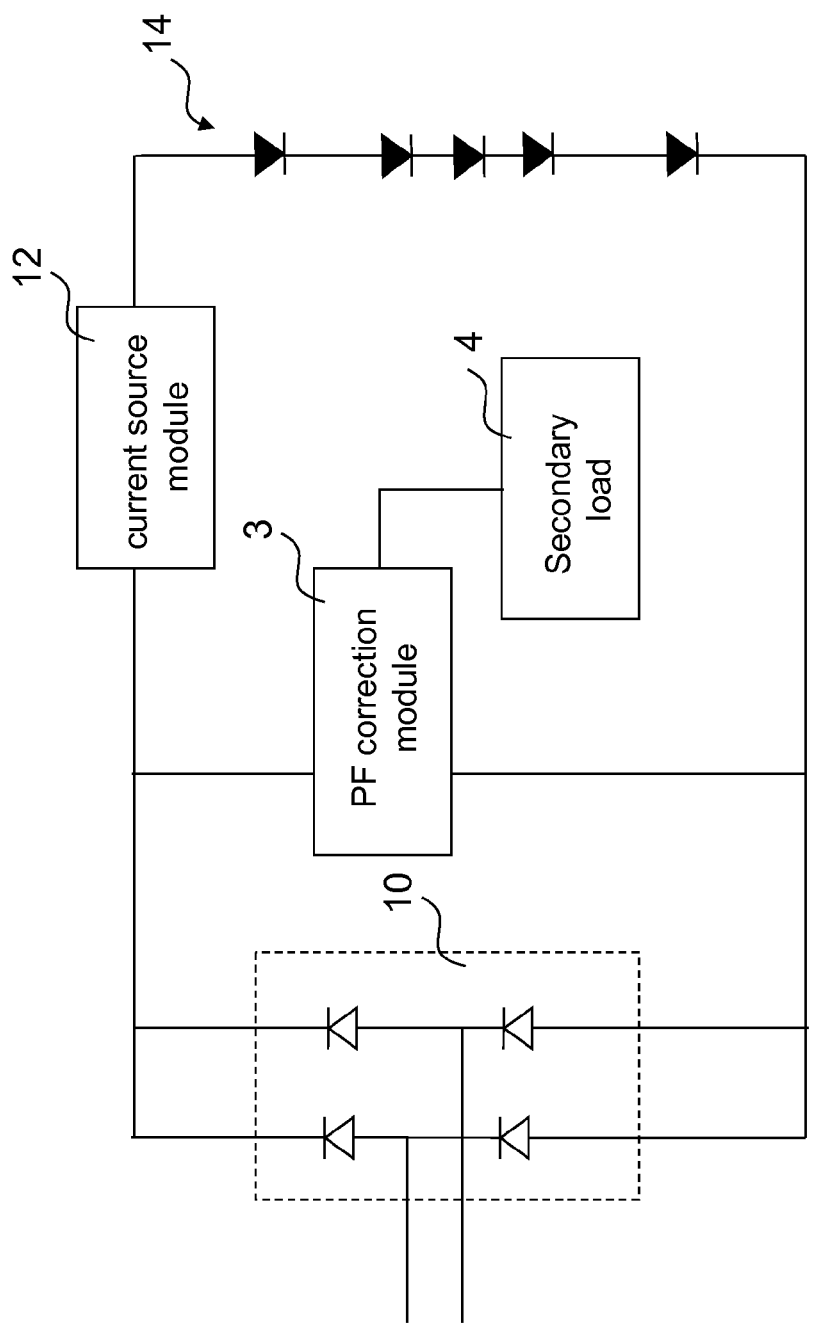
FIG. 3 is a diagram illustrating a device in accordance with an embodiment of the present invention.

Referring to FIG. 3, the device for improving power efficiency of the power factor correction comprises a primary load 14, a power module 10, a power factor correction module 3, a current source module 12, and a secondary load 4. The power module 10 rectifies an alternating current (AC) voltage to a pulsating direct current (DC) voltage. The power factor correction module 3 filters the pulsating direct current (DC) voltage to a driving voltage. The current source module 12 is connected to the power module 10, the primary load 14 and a side of the power factor correction module 12 that drives the primary load 14 with the driving voltage. The secondary load 4 is connected to another side of the power factor correction module 3, and is driven by the power factor correction module 3. Accordingly, the feature in accordance with the embodiment of the present invention is to use normally wasted energy from the power factor correction module 3 to provide useful work.

Figure 4A:
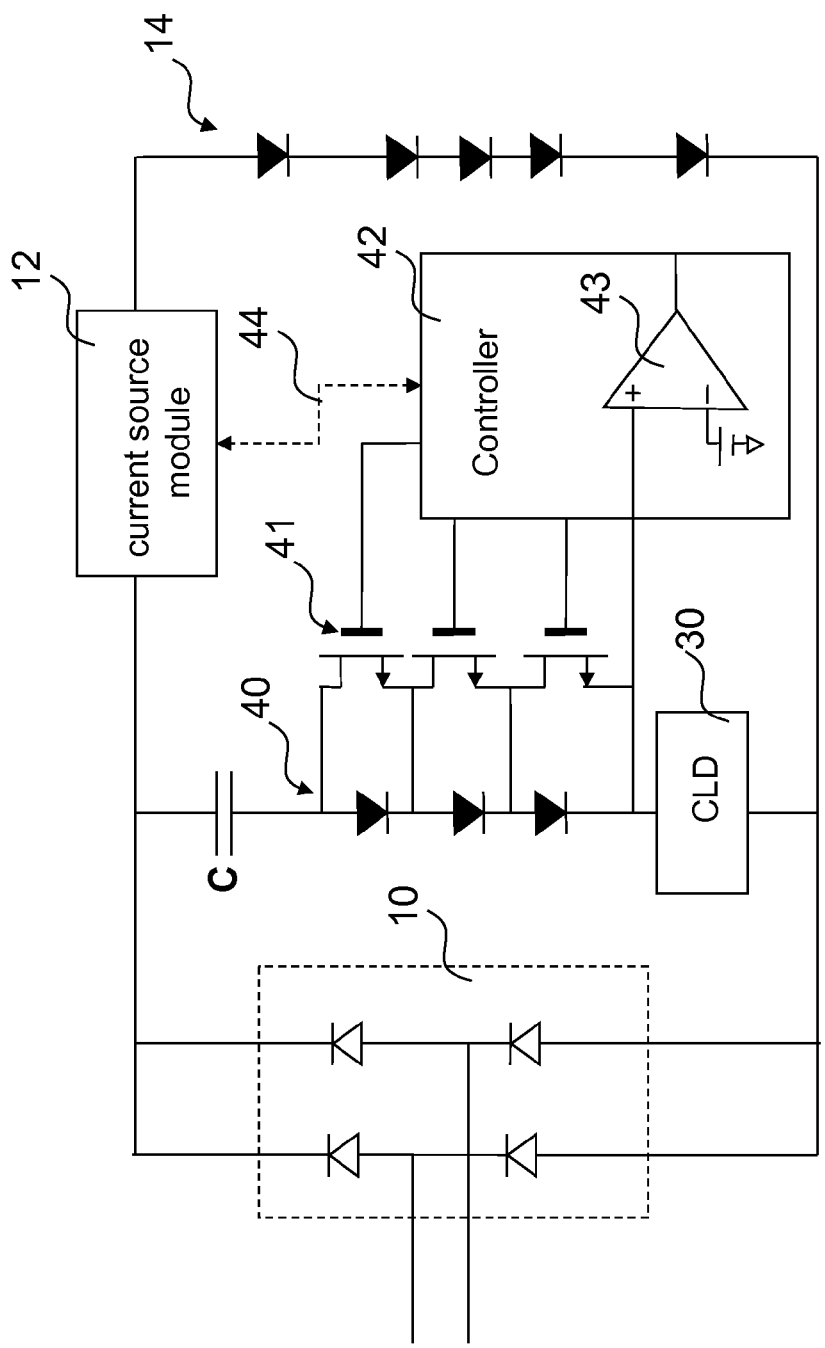
FIG. 4A is a circuit diagram of a device in accordance with another embodiment of the present invention.
Figure 4B:
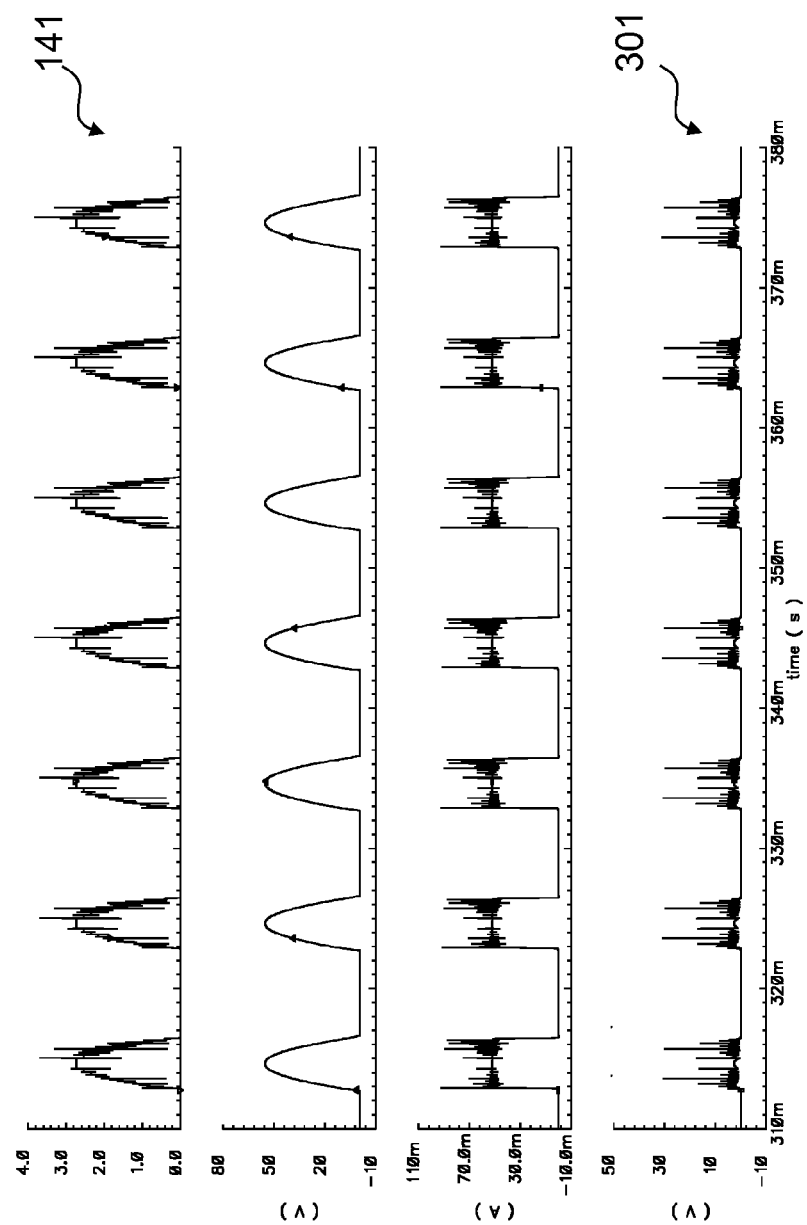
FIG. 4B are simulated waveforms illustrating the relationships of input current and voltage between the CLD and LEDs in FIG. 4A.

With reference to FIGS. 4A and 4B, FIG. 4A illustrates a device adapted to a current limiting device (CLD) power factor correction scheme in accordance with an embodiment of the present invention. In this embodiment, the power module 10 is a bridge rectifier, and the power factor correction module consists of a filter capacitor C and a CLD 30. The primary load 14 is a light emitting diode (LED) string that is connected to the current source module 12. It is noted that while describing the embodiment as a lighting device or a lamp, the present invention here is not limited only to lighting devices, it can be adapted to any electronic device with a power factor correction module.

The filter capacitor C has a first end connected to the power module 10 and the current source module 12, and the secondary load. The secondary load is connected between the CLD 30 and the filter capacitor C, which comprises multiple LEDs 40, multiple switches 41 and a controller 42. As shown in FIG. 4, The multiple LEDs 40 are connected in series between a second end of the filter capacitor C and the CLD 30. The controller 42 is connected to the CLD 30 for sensing a voltage across the CLD 30, and is connected to the third ends of the switches for sequentially disabling the corresponding switch 41 to drive the corresponding LED 40.

In this embodiment, a series connected LED 40 is in a binary weighted configuration and each of the binary weighted segments may be disabled by its corresponding switch. At the top of the CLD 30 is 1 LED, and number of LED bulbs successively doubles (e.g., 2, 4, 8 . . . ). The switches 41 may be NMOS transistors. It is also noted that there are total 3 LEDs (3 binary weighed LED groups) illustrated in FIG. 4A being only for the purposes of illustration and there is no limit on the number of the LEDs that may be used. Furthermore, there is no reason that the LEDs must be arranged in a binary format, and other weighting schemes could be used as well.

The CLD 30 voltage is monitored by the controller 42 so that the proper number of LEDs 40 in series with the filter capacitor C will be connected in series. The voltage across the CLD 30 should be remains between GND and one LED forward voltage. The controller 42 further comprises a comparator 43 connected to the CLD 30, which sequentially disables or enables switches 41 according to a high threshold and a low threshold. Wherein the controller 42 disables the corresponding switch 41 when the voltage of the CLD 30 is higher than the high threshold, and enables the corresponding switch 41 when voltage of the CLD 30 is lower than the low threshold.

At the beginning of a cycle of the pulsating DC voltage, no current flows through the filter capacitor C and the voltage across the CLD 30 will be zero. The controller 42 enables all the NMOS switches 41.

As the cycle continues, current start to flow through the filter capacitor C, the CLD 30 starts to limit the capacitor current which cause the CLD voltage to increase accordingly. As the voltage on the CLD 30 reaches the high threshold of the comparator 43, the controller 42 disables the most bottom NMOS switch 41, allowing current flow through LED 40 and producing light. When the switches 41 are disabled, the increased voltage drop across the LEDs 40 will cause the voltage across the CLD 30 to fall.

As the input voltage cycle continues (but has not yet reached the peak of the cycle of the pulsating DC voltage), the voltage of the CLD 30 continues to climb until it reaches another high threshold, and the controller 42 disables the middle NMOS switch 41 and enables the bottom NMOS switch 41. Current flows through the LEDs 40 corresponded to the middle NMOS switch 41, and the LED corresponded to the bottom NMOS switch 41 is shorted out preventing current flow through it. As the process continues, the increased voltage at the bottom plate (i.e., the second end) of the capacitor C may allow all LEDs 40 to conduct current and produce light.

When the pulsating DC voltage reaches its peak voltage and starts to decrease, the voltage at the bottom plate of filter capacitor C starts to decrease, and the voltage across CLD 30 will necessarily start to decrease. Once the voltage of CLD 30 decreases to a certain low threshold of the comparator 43, the controller 42 enables one NMOS switch 41 and shorts out one of the LEDs 40. The voltage on the CLD 30 will momentarily jump up by one LED forward voltage, and then decrease again as the pulsating DC voltage continues to decrease, and more LEDs 40 are shorted. This process continues until the current in the filter capacitor C reaches zero or all the LEDs 40 are shorted.

Comparing FIG. 4B to FIG. 3B, the voltage 301 across CLD is now maintained under 5 volts (except for some fast transient spikes), which lowers the normally wasted power across the CLD to almost nothing. The power that was once wasted across the CLD shows up as extra LED power 141. The waveforms in FIG. 4B shows numbers of spikes on the waveforms. These spikes are extremely fast in duration and pose little deleterious effects to the claimed invention. By changing the relative ON/OFF time of the NMOS switches, the spikes can be reduced or eliminated.

During the time that the LEDs of the secondary load are being switched ON and OFF could result in some unwanted optical flicker at twice the frequency of the input AC voltage (e.g., 100 Hz flicker for 50 Hz line voltage). In order to keep the total light output of the lighting device constant, the controller 42 is able to send a current adjust signal 44 (As shown in FIG. 4A) to the current source module 12 that controls current through the primary load 14, which if properly interpreted, will maintain a constant overall light output. However, such current compensation is optional, since the added flicker is very minor and may be negligible in many electronic applications.

Figure 5:
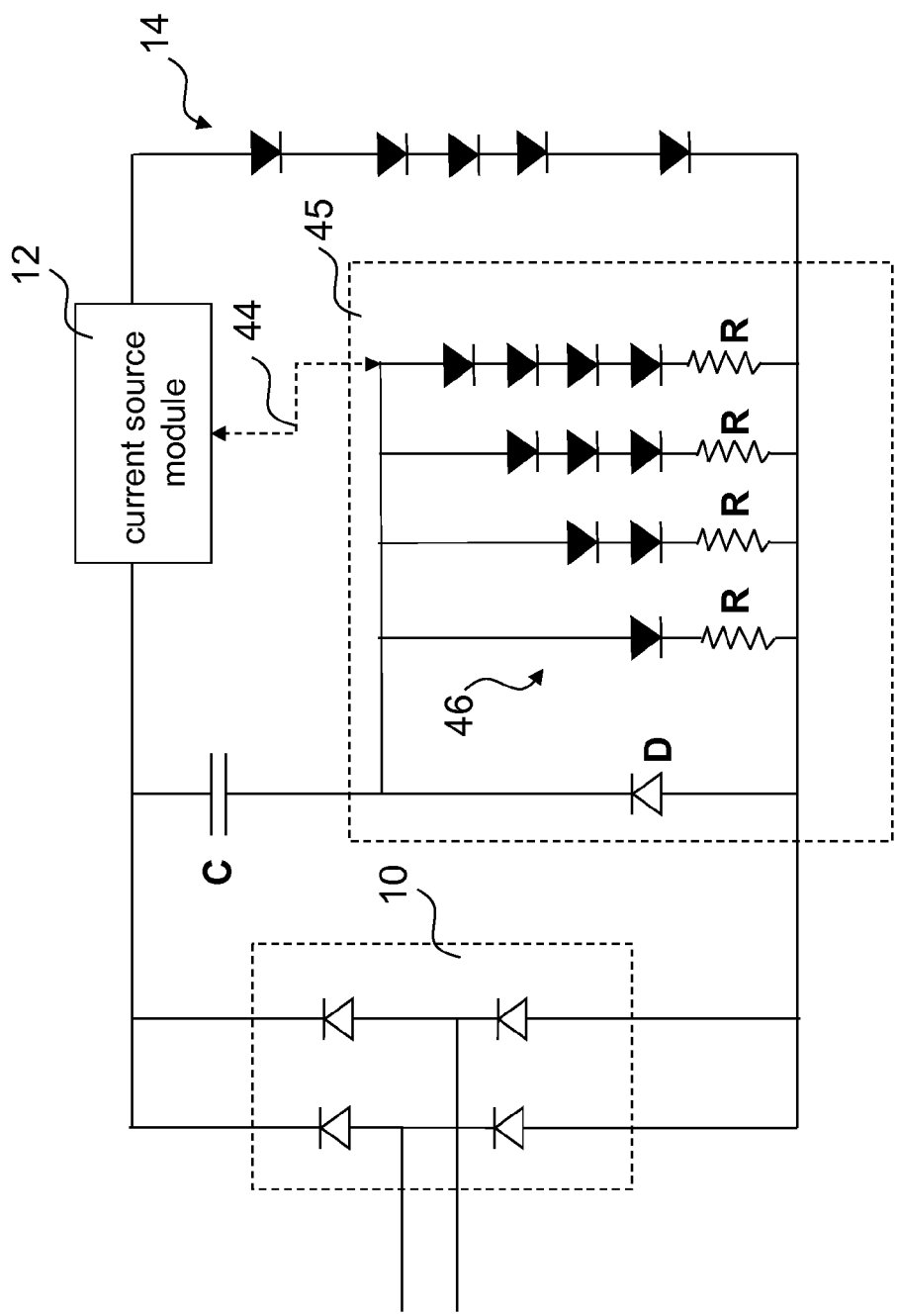
FIG. 5 a circuit diagram of a device in accordance with another embodiment of the present invention.

FIG. 5 illustrates another embodiment of the present invention, which is also adapted for power factor correction and is similar to the embodiment of FIG. 4A, but without using a CLD, comparator module or switches. In this embodiment, the device comprises a catch diode D and an LED array 45. The catch diode D is connected to the second end of the filter capacitor C, and is configured for avoiding any reverse bias condition between the filter capacitor C and the LED array 45. The LED array 45 is connected to the catch diode D in parallel, and comprises multiple paralleled LED strings 46. Each LED string 46 connects in series to a current limiting resistor R, and has multiple LED bulbs connected in series. The different current limiting resistors R do not have to be of equal size and, in general, more optimal operation is produced if the resistance of the current limiting resistor R decreases as the number of LEDs in its corresponding string 46 increases.

The added LED/resistor network limits the current through the filter capacitor C and improves the PF of the device. Some energy is dissipated in the added current limiting resistor R, but much of the capacitor energy is used to produce light. This increases the efficiency of the device above what would normally be attained with a standard CLD approach (shown in FIG. 2A). The inventor's simulation shows that the standard CLD has PF=0.715 and efficiency=94.1%, and the claimed embodiment has PF=0.715 and Efficiency=95.5%, which represents an increase in efficiency of 1.4%.

In this embodiment, the number of LED bulbs sequentially increases among each LED string 46 of the LED array 45, and the resistance of the each current limiting resistors R corresponds inversely to the numbers of the LED bulbs. It is noted that 10 LED bulbs are illustrated in the FIG. 5 for the purposes of illustration, and there is no limit on the number or patterns of LED bulbs in the LED array 45. The desired numbers of the LED bulbs and the paralleled LED strings 46 will need to be adjusted for a particular application.

As the voltage at the second end of the filter capacitor C increases, as shown in FIG. 5, the LED string 46 with the least LED bulbs turns ON, then as the voltage continues to increase, the adjacent LED string 46 with more LED bulbs turns on until all the LED bulbs of the LED strings 46 have been turned on. The number of LED bulbs in the LED string 46 with most number of LED bulbs should provide a forward voltage that is slightly less than the peak voltage at the second end of the filter capacitor C. In this manner, all the LED bulbs will be illuminated by the time the voltage at the second end of the filter capacitor C reaches its peak, without undue power being dissipated in the current limiting resistors R.

Further, when the voltage on the second end of the filter capacitor C decreases, the above mentioned process reverses itself until all the LED bulbs are extinguished.

While the LED bulbs are being turned ON and OFF in LED array 45, a situation happens that is similar to the embodiment in FIG. 4A. Optical flicker may produced at the twice the frequency of the input voltage. Accordingly, the current source module further connects to the LED array, which adjusts current through the primary load so that a constant overall light output is maintained. However, such current compensation is optional, since the added flicker is very minor and may be negligible in many applications.

While the disclosure has been described in connection with a number of embodiments and implementations, the disclosure is not so limited but covers various obvious modifications and equivalent arrangements, which fall within the purview of the appended claims. Although features of the disclosure are expressed in certain combinations among the claims, it is contemplated that these features can be arranged in any combination and order.

What is claimed is:

1. A device for power factor correction, comprising:
   a primary load;
   a power module rectifying an alternating current (AC) voltage to a pulsating direct current (DC) voltage;
   a power factor correction module filtering the pulsating direct current (DC) voltage to a driving voltage from the power module;
   a current source module being connected to the power module, the primary load and a side of the power factor correction module that drives the primary load with the driving voltage; and
   a secondary load being connected to another side of the power factor correction module, and being driven by the power factor correction module using the power that was once wasted.

2. The device as claimed in claim 1, wherein the power factor correction module comprises a filter capacitor having a first end connected to the power module and a current source, and a second end being connected to the secondary load.

3. The device as claimed in claim 2, wherein the power factor correction module further comprises a current limiting device, and the secondary load is connected between the current limiting device and the filter capacitor.

4. The device as claimed in claim 3, wherein the primary load is a light emitting diodes (LED) string, and secondary load comprises:
   multiple LEDs connected in series, and being connected between the second end of the filter capacitor and the current limiting device;
   multiple switches, each switch having a first end, a second and a third end, and the first end and the second end being connected to two ends of the corresponding LED or groups of LEDs; and
   a controller being connected to the current limiting device for sensing a voltage across the current limiting device, and being connected to the third ends of switches for sequentially disabling the corresponding switch to drive the corresponding LED.

5. The device as claimed in claim 4, wherein the controller comprises a comparator connected to the current limiting device, which sequentially disables or enables switches according to a high threshold and a low threshold, wherein the controller disables the corresponding switch when voltage of the current limiting device is higher than the high threshold, and enables the corresponding switch when voltage of the current limiting device is lower than the low threshold.

6. The device as claimed in claim 5, wherein the controller further connects to the current source module, and sends a current adjust signal to the current source module that controls current through the primary load.

7. The device as claimed in claim 2, wherein the primary load is an LED string, and the secondary load comprises:
   a catch diode connected to the second end of the filter capacitor; and
   an LED array connected to the catch diode in parallel, which comprises multiple paralleled LED strings, wherein each LED string connects to a current limiting resistor in series, and has multiple LED bulbs connected in series.

8. The device as claimed in claim 7, wherein the number of LED bulbs sequentially increased among each LED string of the LED array.

9. The device as claimed in claim 7, wherein the current source module further connects to the LED array, which adjusts current through the primary load according to the LED array.

* * * * *